United States Patent [19]
Saunders et al.

[11] Patent Number: 6,046,747
[45] Date of Patent: *Apr. 4, 2000

[54] GRAPHICS APPLICATION PROGRAMMING INTERFACE AVOIDING REPETITIVE TRANSFER OF TEXTURE MAPPING DATA

[75] Inventors: Bradley L. Saunders, Ft. Collins; Brett E. Johnson, Windsor, both of Colo.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/905,669

[22] Filed: Aug. 4, 1997

[51] Int. Cl.⁷ .................................................. G06T 11/40
[52] U.S. Cl. ........................... 345/430; 345/425; 345/522
[58] Field of Search .................................... 345/430, 522, 345/429, 419, 425

[56] References Cited

U.S. PATENT DOCUMENTS

| | | | |
|---|---|---|---|
| 5,097,427 | 3/1992 | Lathrop et al. | 345/430 |
| 5,719,599 | 2/1998 | Yang | 345/430 |
| 5,724,512 | 3/1998 | Winterbottom | 395/200.56 |
| 5,745,118 | 4/1998 | Alcorn et al. | 345/430 |
| 5,751,292 | 5/1998 | Emmot | 345/430 |
| 5,781,197 | 7/1998 | Saunders | 345/430 |
| 5,790,130 | 8/1998 | Gannett | 345/430 |
| 5,798,762 | 8/1998 | Sfarti et al. | 345/420 |
| 5,812,141 | 9/1998 | Kamen et al. | 345/430 |
| 5,835,096 | 11/1998 | Baldwin | 345/430 |
| 5,886,706 | 3/1999 | Alcorn et al. | 345/430 |
| 5,892,517 | 4/1999 | Rich | 345/430 |
| 5,917,497 | 6/1999 | Saunders | 345/430 |
| 5,936,632 | 8/1999 | Cunniff et al. | 345/430 |
| 5,987,567 | 11/1999 | Rivard et al. | 711/118 |

*Primary Examiner*—Mark K. Zimmerman
*Assistant Examiner*—Albert K. Lee

[57] ABSTRACT

A computer graphics system includes a host computer, including a graphics application program and an application programming interface, and graphics hardware. The application programming interface creates a display list for receiving and storing user-specified commands and stores each user-specified texture download command in a texture image list. When a texture processing command is received and the corresponding texture map is optimizable, the texture image list is stored in a texture object, the texture object is marked as not downloaded and a bind texture call is inserted in the display list. The bind texture call contains a reference to the texture object. When the display list is executed, each bind texture call in the display list is processed by: (a) downloading the texture map referenced by the bind texture call to the graphics hardware when the referenced texture object is marked as not downloaded, and marking the referenced texture object as downloaded, and (b) binding texture information in the texture object to a current texture state, wherein the texture map is downloaded to the graphics hardware only once for a given texture state of the application programming interface.

19 Claims, 5 Drawing Sheets

GRAPHICS APPLICATION PROGRAMMING INTERFACE AVOIDING REPETITIVE TRANSFER OF TEXTURE MAPPING DATA

FIELD OF THE INVENTION

This invention relates generally to computer graphics systems and, more particularly, to methods and apparatus for efficient handling of texture mapping data in a graphics application programming interface, such as OpenGL.

BACKGROUND OF THE INVENTION

Computer graphics systems are commonly used for displaying two-and three-dimensional graphics representations of objects on a two-dimensional video display screen. Current computer graphics systems provide highly detailed representations and are used in a variety of applications, such as computer-aided design, animation and the like.

In a typical computer graphics system, an object or model to be represented on the display screen is broken down into graphics primitives. Primitives are basic components of a graphics display and may include, for example, points, lines, triangles, quadrilaterals, triangle strips and polygons. Typically, a hardware/software scheme is implemented to render, or draw, the graphics primitives that represent a view of one or more objects being represented on the display screen.

Generally, the primitives of a three-dimensional object to be rendered are defined by a host computer in terms of primitive data. For example, when the primitive is a triangle, the host computer may define the primitives in terms of the X, Y, Z and W coordinates of its vertices, as well as the red, green, blue and alpha (R, G, B and α) color values of each vertex. Additional primitive data, such as texture mapping data, may be used in some applications. Rendering hardware interpolates the primitive data to compute the display screen pixels that represent each primitive, and the R, G and B color values for each pixel.

Texture mapping permits objects to be displayed with improved surface detail. Texture mapping is a method that involves mapping a source image, referred to as a texture, onto the surface of a three-dimensional object, and thereafter projecting the textured three-dimensional object to the two-dimensional graphics display screen to display the resulting image. Texture mapping involves applying one or more point elements (texels) of a texture to each point element (pixel) of the displayed portion of the object to which the texture is being mapped. Texture mapping hardware subsystems typically include a local memory cache that stores texture mapping data associated with the portion of the object being rendered.

The basic components of a computer graphics system typically include a host computer and graphics hardware. The host computer may include a graphics application programming and an application programming interface. The application programming interface (API) receives commands from a user through the graphics application program and provides primitive data, as described above, to the graphics hardware. The graphics hardware typically includes a geometry accelerator, a rasterizer and a frame buffer, and may include texture mapping hardware. The geometry accelerator receives primitive data from the host computer and performs operations such as coordinate transformations and lighting, clipping and plane equation calculations for each primitive. The output of the geometry accelerator, referred to as rendering data, is used by the rasterizer and the texture mapping hardware to generate final screen coordinate and color data for each pixel in each primitive. The pixel data from the rasterizer and the pixel data from the texture mapping hardware are combined and stored in the frame buffer for display on the video display screen.

The application programming interface in the host computer frequently utilizes the OpenGL® standard. (OpenGL is a registered trademark of Silicon Graphics, Inc.) The OpenGL application programming interface provides specific commands that are used to specify objects and operations for generation of graphics displays. OpenGL is a hardware independent interface designed to be implemented on different hardware platforms. As such, in computer systems which support OpenGL, the operating systems and graphics application programs can make calls to the graphics hardware according to the standardized program interface without knowledge of the underlying hardware configuration.

The OpenGL standard provides a complete library of low level graphics manipulation commands for describing models of three-dimensional objects. This standard was originally based on the proprietary standards of Silicon Graphics, Inc., but was later transformed into an open standard which is used in high end graphics-intensive workstations and, more recently, in high end personal computers. The OpenGL standard is described in the *OpenGL Programming Guide*, Version 1.1 (1997) and the *OpenGL Reference Manual*, Version 1.1 (1997).

The application programming interface is required to download very large quantities of data to the graphics hardware. For example, the data for a single quadrilateral may be on the order of 64 words of 32 bits each. A single frame of a graphics display typically includes hundreds of thousands of primitives. Thus, the efficiency with which primitive data is downloaded to the graphics hardware, and the speed at which the graphics hardware processes the primitive data, are important factors in achieving high speed in graphics systems.

One inefficiency in the operation of Version 1.0 of the OpenGL application programming interface is the way in which texture mapping data is downloaded to the graphics hardware in connection with display lists. OpenGL commands are placed in a display list, and the commands in the display list are executed in response to additional commands from the application program. Texture map downloading commands in the form of glTexImage commands are stored in the display list. Each time the display list is executed, the glTexImage commands cause the texture mapping data to be downloaded to the graphics hardware. Since the texture mapping data may remain fixed during multiple executions of the display list, the same texture mapping data may be downloaded to the graphics hardware multiple times. This operation is clearly wasteful of available data bandwidth between the host computer and the graphics hardware, and degrades performance.

Accordingly, it is desirable to provide methods and apparatus for processing graphics information in a computer graphics system wherein the repetitive transfer of the same texture mapping data is avoided.

SUMMARY OF THE INVENTION

According to the present invention, methods and apparatus for processing graphics information in a computer graphics system are provided. The computer graphics system comprises a host computer, including a graphics application program and an application programming interface, and graphics hardware. The application programming interface executes the steps of creating a display list for receiving and storing user-specified commands and storing each user-specified texture download command in a texture image list. When a texture processing command is received and the texture map corresponding to the texture download command is optimizable, the texture image list is stored in a texture object, the texture object is marked as not downloaded and a bind texture call is inserted in the display list. The bind texture call contains a reference to the texture object. When a texture processing command is received and the texture map is not optimizable, the corresponding texture download command is stored in the display list along with the corresponding texture image data. The texture processing command is then stored in the display list. When the display list is executed, each bind texture call in the display list is processed by: (a) downloading the texture map in the texture object referenced by the bind texture call to the graphics hardware when the referenced texture object is marked as not downloaded, and marking the referenced texture object as downloaded, and (b) binding texture information in the texture object referenced by the bind texture call to the current texture state, wherein the texture map is downloaded to the graphics hardware only once for a given texture state of the application programming interface.

The application programming interface preferably comprises the OpenGL application programming interface. The texture download command may comprise a glTexImage1D or a glTexImage2D command. The texture processing command may, for example, comprise a glPixelStore, glPixelTransfer, glPixelMap, glPixelZoom, glBegin or glEndList command.

The texture map may be considered optimizable when it includes only a single base level texture map or when it includes a full MIP map in ascending order. Other texture map configurations may optionally be defined as optimizable. Preferably, valid texture maps are considered to be optimizable.

According to a further feature of the invention, state changes in the application programming interface may be monitored. Each texture object is marked as not downloaded in response to a state change that affects texture mapping. Specifically, each texture object may be marked as not downloaded in response to a texture processing command that affects 2D imaging pipeline.

According to another aspect of the invention, the application programming interface executes the steps of creating a display list for receiving and storing user specified commands and storing user specified commands except texture download commands that are optimizable in the display list. For each user specified texture download command that is optimizable, a bind texture call is stored in the display list. The bind texture call contains a reference to a texture map corresponding to the texture download command. When the display list is executed, each bind texture call in the display list is processed by: (a) downloading texture map referenced by the bind texture call to the graphics hardware when the texture map is marked as not downloaded, and marking the texture map as downloaded, and (b) binding the texture map referenced by the bind texture call to a current texture state, wherein the texture map is downloaded to the graphics hardware only once for a given texture state of the application programming interface.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
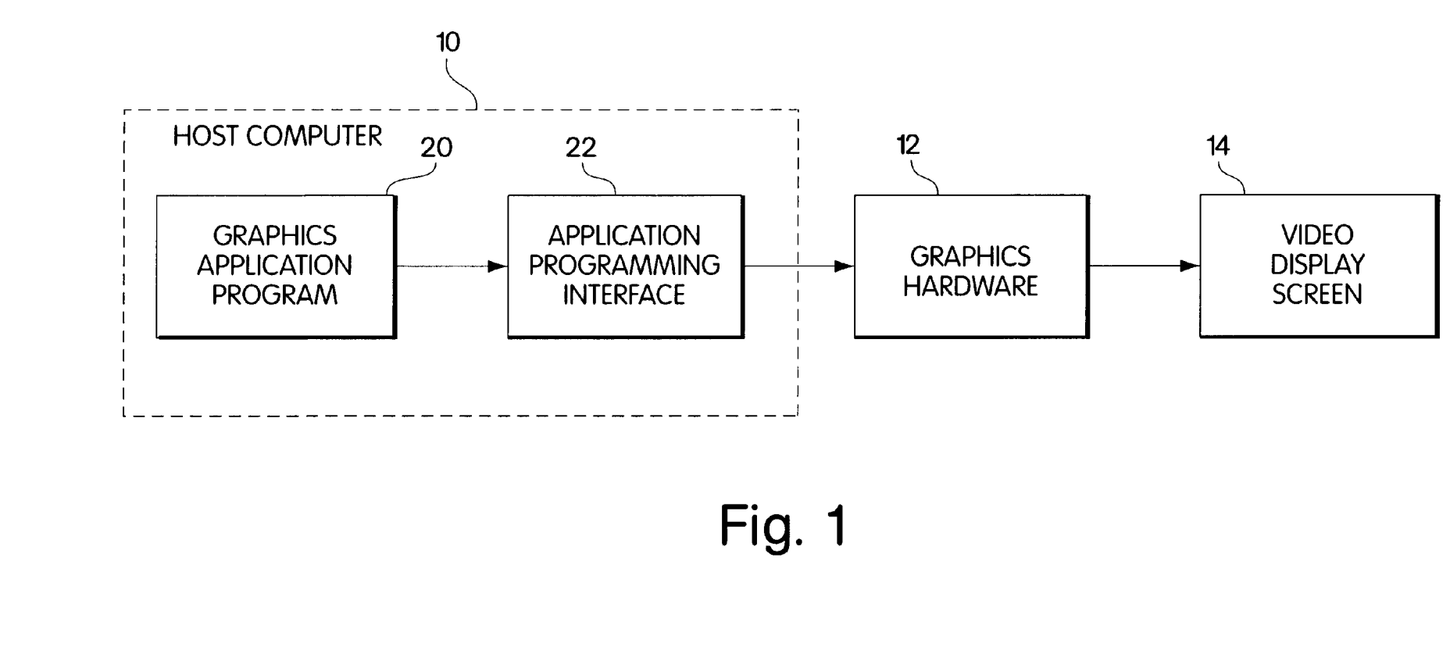
FIG. 1 is a block diagram of a computer graphics system suitable for incorporation of the present invention.

A simplified block diagram of a computer graphics system suitable for incorporation of the present invention is shown in FIG. 1. A host computer 10 supplies graphics information to graphics hardware 12. The graphics hardware 12 renders the graphics information to generate a two-dimensional display on a video display screen 14. The host computer 10 typically provides descriptions of graphics primitives, such as points, lines, triangles, quadrilaterals, triangle strips and polygons. The graphics information includes X, Y, Z and W coordinates of the vertices of the primitives and red, green, blue and alpha color values of each vertex. Additional information may include texture mapping data and lighting information. The graphics hardware 12 processes the information received from the host computer and generates display screen coordinates and color data for each pixel of each primitive. The pixel data is stored in a frame buffer for display on video display screen 14. The graphics hardware 12, for example, may be a Model VISUALIZE FX4 manufactured and sold by Hewlett-Packard Company.

The host computer 10 includes a graphics application program 20 and an application programming interface 22. The graphics application program 20 is a user application such as, for example, a computer-aided design system. The application programming interface 22 receives commands from the graphics application program 20 and provides graphics information, such as primitive data and texture mapping data, to graphics hardware 12. The application programming interface 22 is preferably in compliance with the OpenGL standard, as described above. The host computer 10 is typically a high performance workstation such as an HP VISUALIZE Workstation manufactured and sold by Hewlett-Packard Company. The host computer preferably includes at least 64 megabytes of memory and a hard disk with a capacity of 4.0 gigabytes or more. The host computer 10 preferably uses the HP-ux 10,20 operating system, a UNIX based operating system. The graphics application program 20 and the application programming interface 22 may, for example, be implemented using the C programming language. It will be understood that any workstation or other computer having similar capabilities may be utilized within the scope of the present invention.

As described above, large volumes of data must be downloaded from the host computer 10 to the graphics hardware 12 by application programming interface 22. The efficiency of the computer graphics system depends in part on the efficiency of operation of application programming interface 22 and the efficiency with which it downloads graphics information to graphics hardware 12. The present invention provides a technique for high efficiency handling of texture mapping data by application programming interface 22 and for high efficiency downloading of texture mapping data from application program 22 to graphics hardware 12 using the OpenGL application programming interface.

The OpenGL API utilizes the concept of display lists. A display list is a list of OpenGL commands that have been stored for later execution. The display list is created starting with a glNewList command. The desired OpenGL commands are entered into the list, and the list is terminated with a glEndList command. The display list is subsequently executed in response to a glCallList command. The display list performs a specified rendering operation such as, for example, downloading a texture map to graphics hardware 12. Typically, the display list is executed multiple times after it is created. The glTexImage commands cause a texture map to be downloaded to the graphics hardware, typically with processing of the texture data prior to downloading.

The glTexImage command defines a texture. Parameters of the glTexImage command include target, internal format, width, height, border, format, type and pixels. The pixels parameter contains the texture mapping data which describes the texture image. This and other features of the OpenGL API, including display lists, the imaging pipeline and other commands, are described in detail in the aforementioned *OpenGL Programming Guide* and *OpenGL Reference Manual*, which are hereby incorporated by reference.

In the prior art OpenGL, Version 1.0, the glTexImage commands are placed in the display list in the same manner as other commands. Each time a display list containing one or more glTexImage commands is executed, the corresponding texture map is downloaded to the graphics hardware. Frequently the same texture mapping data is downloaded to the graphics hardware multiple times, resulting in inefficient operation.

Figure 2A:
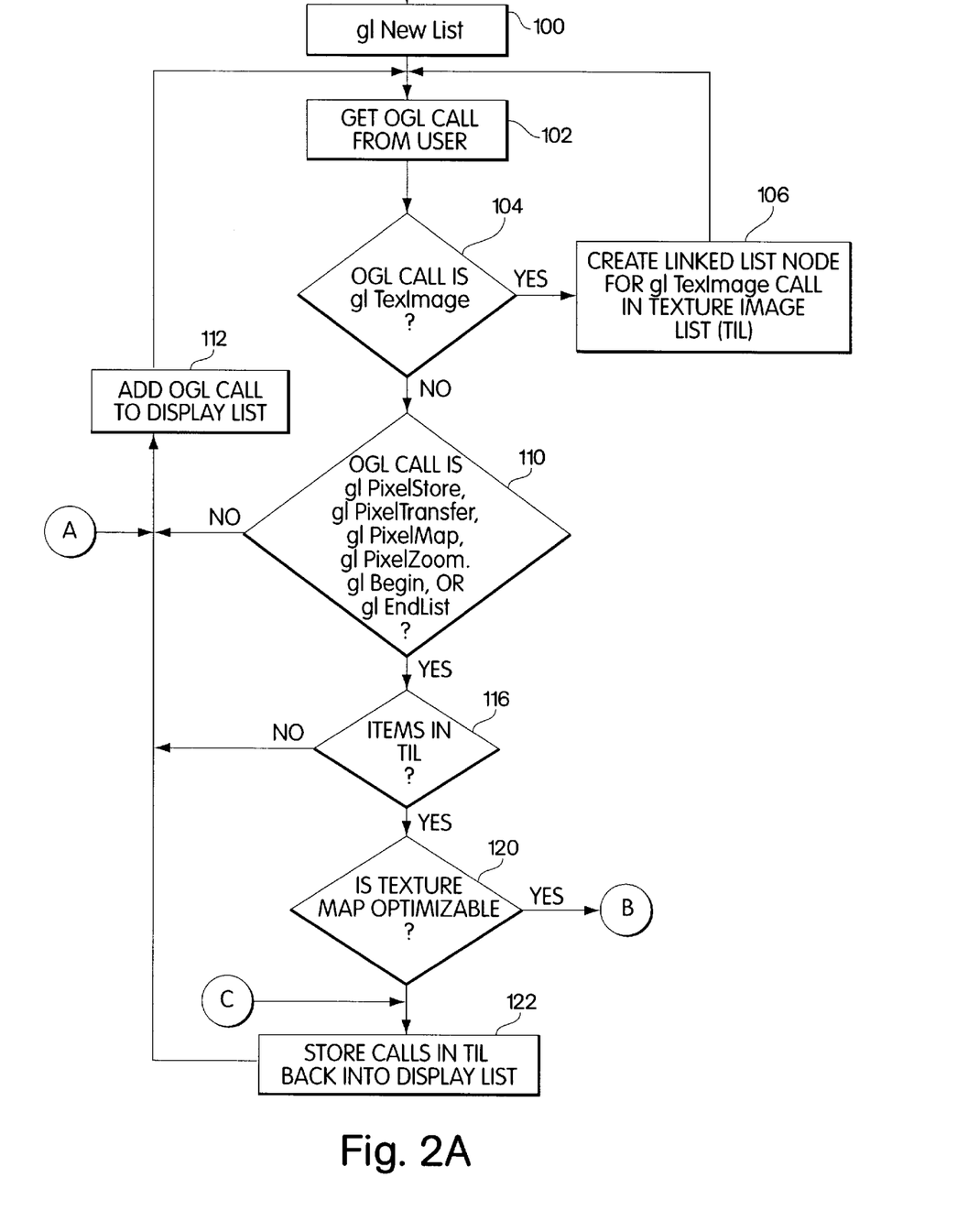
FIG. 2A and 2B are flow charts of an example of display list creation in accordance with the present invention.
Figure 2B:
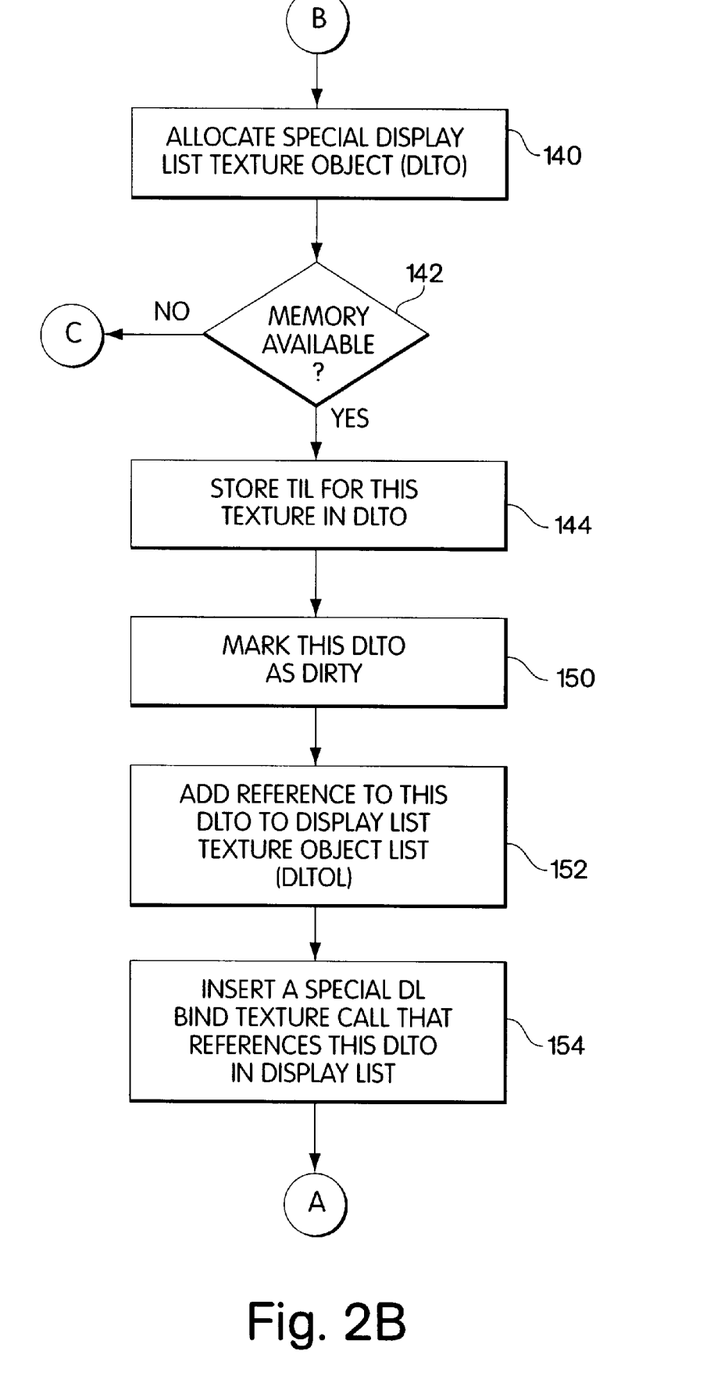

A flow chart of a process for creating a display list in accordance with the invention is shown in FIGS. 2A and 2B. The operations shown in FIGS. 2A and 2B are executed by the application programming interface 22. In step 100, a glNewList command is received from graphics application program 20. The glNewList command initiates the creation of a display list. In step 102, an OpenGL command (call) is received from the graphics application. In step 104, a determination is made whether the OpenGL command is a glTexImage command. In the present embodiment, only one-dimensional (1D) and two-dimensional (2D) glTexImage commands are optimized as described below. When the command is a glTexImage (1D or 2D) command, the command is entered into a Text Image List (TIL) in step 106. More specifically, a linked list node for the glTexImage command is created in the Text Image List. Thus, the glTexImage commands are placed in the Text Image List rather than in the display list. The process then returns to step 102 to wait for an additional OpenGL command from the graphics application program.

When the OpenGL command is not a glTexImage (1D or 2D) command, a determination is made in step 110 as to whether the OpenGL command is one of a group of commands that may require processing of a texture map associated with the glTexImage commands in the Text Image List. More specifically, a determination is made as to whether the OpenGL command is a glPixelStore command, a glPixelTransfer command, a glPixelMap command, a glPixelZoom command, a glBegin command, or a glEndList command. The glPixelStore, glPixelTransfer, glPixelMap and glPixelZoom commands produce a change in state of a 2D imaging pipeline through which the texture mapping data passes as it is downloaded to the graphics hardware. It will be understood that these are examples of texture processing commands and that additional texture processing commands may be defined within the scope of the present invention. The glBegin command initiates rendering of a primitive, and the glEndList command signals the end of display list creation. When the received command is not one of the commands specified above, the command is added to the display list in step 112. When the received command is one of the commands specified above, a determination is made in step 116 as to whether any items are present in the Text Image List. When no items are present in the Text Image List, the command identified in step 110 is added to the display list in step 112.

When items are present in the Text Image List, a determination is made in step 120 as to whether the texture map corresponding to the glTexImage commands in the Text Image List is optimizable in accordance with the invention. In the present example, a texture map is optimizable if it is: (1) a single base level texture map, or (2) a full MIP map as defined by OpenGL in ascending order. It will be understood that different criteria may be established for determining whether a texture map is optimizable. In the present example, a texture map is considered to be optimizable if it is a valid texture map as defined in the OpenGL standard. A texture map is valid if: (1) for the case of not MIP mapping, the texture map must have at least a single (a base level or level 0) and must also have a valid width (greater than 0) and height (for 2D texture maps); and (2) for MIP mapping, the texture map must have a base map equal to that described in (1) above. In addition, the texture map must have subsequent levels that a width and height (for 2D texture maps) defined as $w(N)=w(N-1)/2$, where N is the current level of the texture map; if w is less than 1, then w=1 (the same applies for height). The texture map must include enough levels such that the last level of the texture map has a width of 1 and a height of 1 (for 2D texture maps). Each level of the MIP map must have the same internal format and border size as the base level map. When the texture map is determined in step 120 not to be optimizable, the commands in the Texture Image List are stored back into the display list in step 122. Then the command identified in step 110 is added to the display list in step 112.

Referring now to FIG. 2B, when the texture map is determined to be optimizable, a special display list texture object (DLTO) is allocated in step 140. In step 142, a determination is made as to whether sufficient memory is available to create the texture object. The required memory space depends on the size of the texture map. When sufficient memory is not available, the process returns to step 122 (FIG. 2A), and the commands in the Text Image List are stored back into the display list. Thus, the optimization process is not performed when sufficient memory is not available. When a determination is made in step 142 that sufficient memory is available, the Text Image List for the corresponding texture map is stored in the display list texture object in step 144. Then the display list texture object is marked as "dirty" by setting a "dirty" flag in step 150. The "dirty" flag, when set, indicates that the texture map in the display list texture object has not yet been downloaded to the graphics hardware. In step 152, a reference to the display list texture object is added to a display list texture object list (DLTOL). The display list texture object list is used for quickly identifying optimized textures. In step 154, a special bind texture call that references the display list texture object is inserted into the display list. The special bind texture call includes a target parameter that defines the dimension of the texture map and an ID number that identifies the display list texture object. The effect of these operations is that, when the texture map corresponding to a glTexImage command is determined to be optimizable, a bind texture call is substituted for the glTexImage command or commands in the display list. The bind texture call references the display list texture object containing the required texture information.

Figure 3:
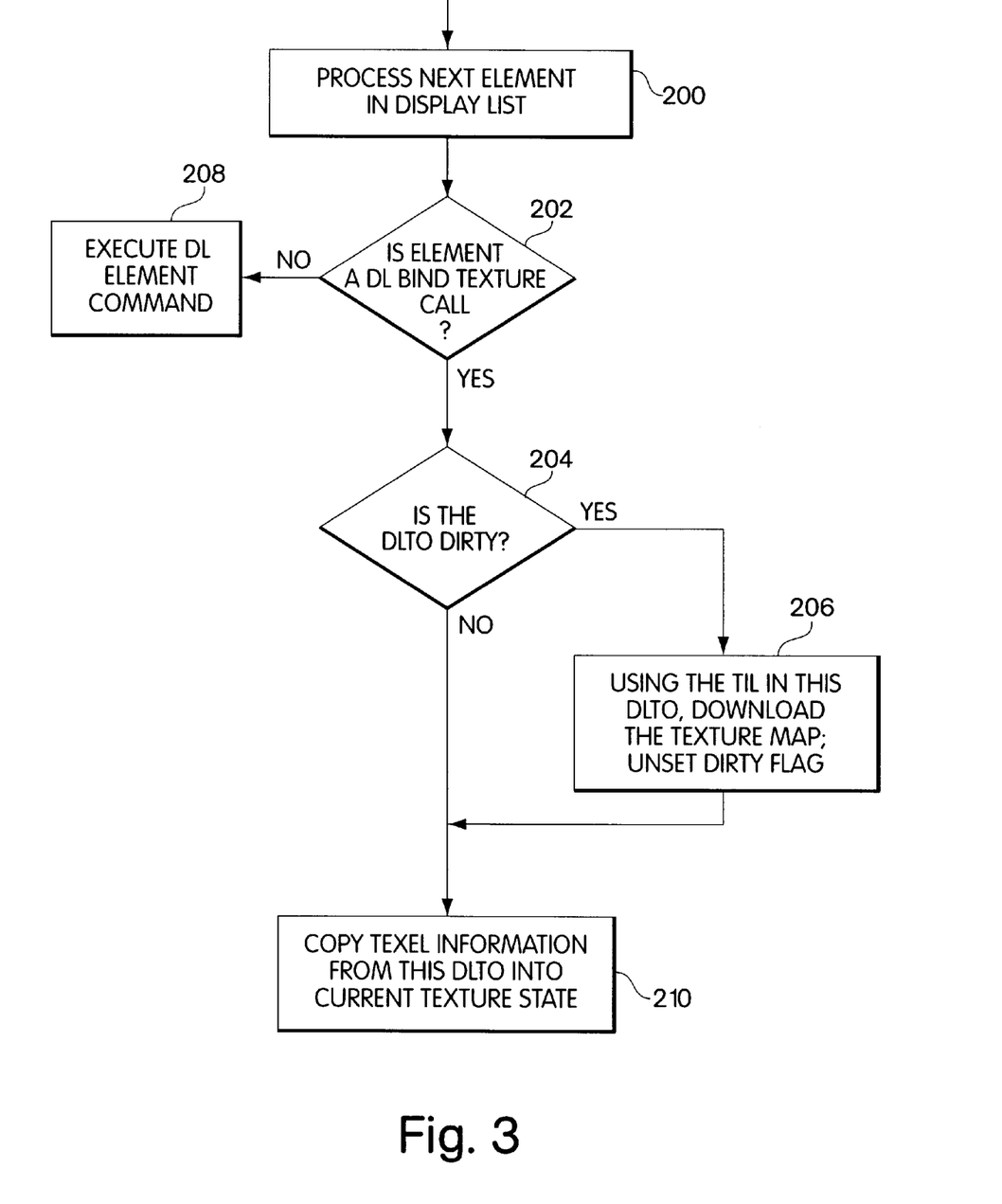
FIG. 3 is a flow chart of an example of display list execution in accordance with the invention.

A flow chart of an example of a process for display list execution in accordance with the invention is shown in FIG. 3. The display list is executed by the application programming interface 22. Display list execution may be initiated by a glCallList command received from the graphics application program 20. In step 200, the first or next element in the display list is processed in accordance with OpenGL operating procedures. In step 202, a determination is made whether the element being processed is a bind texture call. When the display list element is not a bind texture call, the display list element command is executed in step 208. The process then returns to step 200 to process the next element in the display list. When the display list element is a bind texture call, a determination is made in step 204 as to whether the display list texture object referenced by the bind texture has its "dirty" flag set. When the display list texture object is marked as "dirty", the Texture Image List in the display list texture object is used to download the corresponding texture map to the graphics hardware in step 206. The texture map passes through the 2D imaging pipeline and may be processed in accordance with the state of the 2D imaging pipeline. Then the "dirty" flag is unset, thereby indicating that the corresponding texture map has been downloaded to the graphics hardware. When the "dirty" flag for the display list texture object is not set, as determined in step 204, or following step 206, the texel information in the display list texture object is accessed by the bind texture call in the display list in step 210. More specifically, the texel information is copied from the display list texture object into the current texture state of the OpenGL application programming interface. The process then returns to step 200 for processing the next element in the display list. As is apparent in FIG. 3, the texture map is downloaded to the graphics hardware only once, provided that the "dirty" flag remains unset. On subsequent executions of the display list, the bind texture call in the display list references the display list texture object and causes the texture information from the display list texture object to be copied into the current texture state, without downloading of the texture map.

As indicated above, the texture map passes through the 2D imaging pipeline as it is downloaded from the application programming interface 22 to the graphics hardware 12. The 2D imaging pipeline may involve processing of the texture mapping data. OpenGL is a state machine that is put into various states that remain in effect until one or more states are changed. To avoid having texture mapping data in the graphics hardware that is inconsistent with the state of the 2D imaging pipeline, state changes in the application programming interface are monitored as described below. If the state of the 2D imaging pipeline changes following downloading of the texture mapping data, the display list texture objects are marked as "dirty", and the texture mapping data is downloaded again on the next execution of the related display list.

Figure 4:
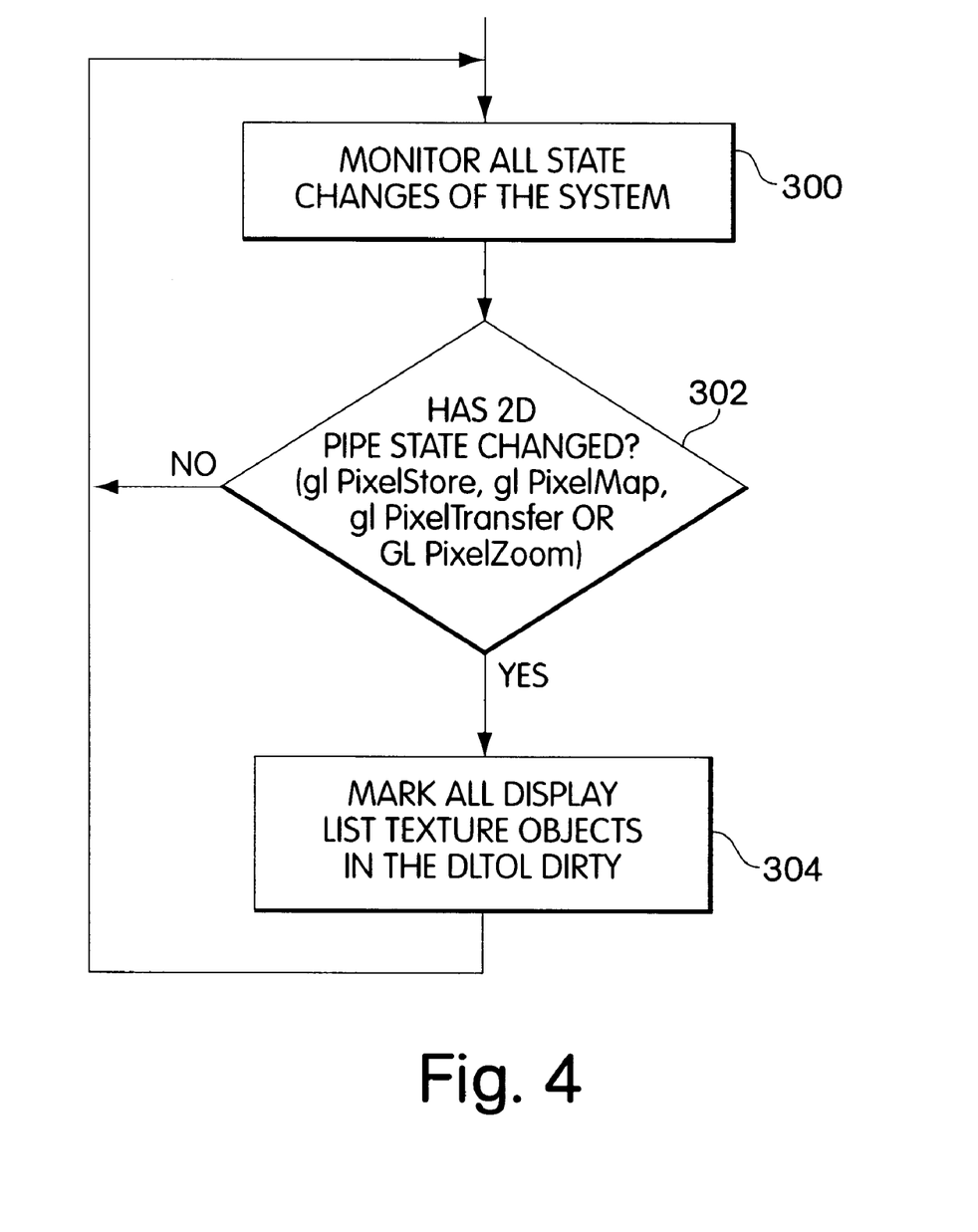
FIG. 4 is a flow chart of an example of a process for monitoring state changes in the application programming interface.

A flow chart of a process for monitoring state changes in the application programming interface 22 is shown in FIG. 4. The monitoring process is executed by the application programming interface 22. In step 300, state changes in the application programming interface 22 are monitored. In step 302, a determination is made as to whether the 2D imaging pipeline state has changed. More specifically, a change in the state of the 2D imaging pipeline is indicated by receipt of a glPixelStore command, a glPixelTransfer command, a glPixelMap command or a glPixelZoom command from the graphics application program 20. When the state of the 2D imaging pipeline has not changed, no action is taken and monitoring of state changes continues in step 300. When the state of the 2D imaging pipeline has changed, all display list texture objects in the display list texture object list are marked as "dirty." The effect of this operation is to require all texture maps to be downloaded upon the next execution of the display list in which they are referenced. Specifically, the texture map is downloaded in step 206 (FIG. 3) because the "dirty" flag is now determined in step 204 to be set. The monitoring process represented by FIG. 4 ensures coherency between the application programming interface 22 and the graphics hardware 12, while avoiding multiple downloads of the same information.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for processing graphics information in a computer graphics system comprising a host computer, including a graphics application program and an application programming interface, and graphics hardware, said application programming interface executing the steps of:
   (a) creating a display list for receiving and storing user-specified commands;
   (b) storing each user-specified texture download command in a texture image list;
   (c) when a texture processing command is received and a texture map corresponding to the texture download command is optimizable, storing the texture image list in a texture object, marking the texture object as not downloaded and inserting a bind texture call in the display list, said bind texture call containing a reference to the texture object;
   (d) when a texture processing command is received and the texture map is not optimizable, storing the corresponding texture download command in the display list;
   (e) storing the texture processing command in the display list; and
   (f) when the display list is executed, processing each bind texture call in the display list by:
      (f1) downloading the texture map in the texture object referenced by the bind texture call to the graphics hardware when the referenced texture object is marked as not downloaded, and marking the referenced texture object as downloaded; and
      (f2) binding texture information in the texture object referenced by the bind texture call to a current texture state, wherein the texture map is downloaded to the graphics hardware only once for a given texture state of the application programming interface, wherein steps (a)–(f) are executed by said application programming interface in said host computer.

2. A method as defined in claim 1 wherein the application programming interface comprises OpenGL application programming interface.

3. A method as defined in claim 2 wherein the texture download command comprises a glTexImage1D or a glTexImage2D command.

4. A method as defined in claim 2 wherein the texture processing command is one of a group comprising glPixelStore, glPixelTransfer, glPixelMap, glPixelZoom, glBegin and glEndList commands.

5. A method as defined in claim 1 wherein the texture map is optimizable when it includes only a single base level texture map.

6. A method as defined in claim 1 wherein the texture map is optimizable when it includes a full MIP map in ascending order.

7. A method as defined in claim 1 wherein step (c) further includes the steps of determining whether sufficient memory is available for the texture object and performing the steps of storing the texture image list in the texture object, marking the texture object as not downloaded and inserting the bind texture call in the display list only when sufficient memory is available, and storing the corresponding texture download command in the display list when sufficient memory is not available.

8. A method as defined in claim 2 further including the steps of monitoring state changes in the application programming interface and marking the texture object as not downloaded in response to a state change that affects texture map processing.

9. A method as defined in claim 8 wherein the texture object is marked as not downloaded in response to a glPixelStore command, a glPixelTransfer command, a glPixelMap command or a glPixelZoom command.

10. A method as defined in claim 2 wherein step (f2) includes copying the texture information from the texture object referenced by the bind texture call to the current texture state of the application programming interface.

11. A computer graphics system for processing graphics information comprising:
- a host computer, including a graphics application program and an application programming interface, and graphics hardware;
- said application programming interface including:
  - means for creating a display list for receiving and storing user-specified commands;
  - means for storing each user-specified texture download command in a texture image list;
  - means, responsive to receipt of a texture processing command and a determination that a texture map corresponding to the texture download command is optimizable, for storing the texture image list in a texture object, marking the texture object as not downloaded and inserting a bind texture call in the display list, the bind texture call containing a reference to the texture object;
  - means, responsive to receipt of a texture processing command and a determination that the texture map corresponding to the texture download command is not optimizable, for storing the corresponding texture download command in the display list;
  - means for storing the texture processing command in the display list; and
  - means, operative during execution of the display list, for processing each bind texture call in the display list by downloading the texture map in the texture object referenced by the bind texture call to the graphics hardware when the referenced texture object is marked as not downloaded, and marking the referenced texture object as downloaded, and binding texture information in the texture object referenced by the bind texture call to a current texture state, wherein the texture map is downloaded to the graphics hardware only once for a given texture processing state of the application programming interface.

12. A computer graphics system as defined in claim 11 wherein the application programming interface comprises OpenGL application programming interface.

13. A computer graphics system as defined in claim 11 wherein the texture map is defined as optimizable when it includes only a single base level texture map.

14. A computer graphics system as defined in claim 11 wherein the texture map is defined as optimizable when it includes a full MIP map in ascending order.

15. A computer graphics system as defined in claim 11 further including means for monitoring state changes in the application programming interface and means for marking the display list texture object as not downloaded in response to a state change that affects texture mapping.

16. A method for processing graphics information in a computer graphics system comprising a host computer, including a graphics application program and an application programming interface, and graphics hardware, said application programming interface executing the steps of:
- (a) creating a display list for receiving and storing user-specified commands;
- (b) storing user-specified commands except texture download commands that are optimizable in the display list;
- (c) for each user-specified texture download command that is optimizable, storing a bind texture call in the display list, the bind texture call containing a reference to a texture map corresponding to the texture download command; and
- (d) when the display list is executed, processing each bind texture call in the display list by:
  - (d1) downloading the texture map referenced by the bind texture call to the graphics hardware when the texture map is marked as not downloaded, and marking the texture map as downloaded; and
  - (d2) binding the texture map referenced by the bind texture call to a current texture state, wherein the texture map is downloaded to the graphics hardware only once for a given texture of the application programming interface, wherein steps (a)–(d) are executed by said application programming interface in said host computer.

17. A method as defined in claim 16 wherein the texture map is optimizable when it includes only a single base level texture map.

18. A method as defined in claim 16 wherein the texture map is optimizable when it includes a full MIP map in ascending order.

19. A method as defined in claim 16 further including the steps of monitoring state changes in the application programming interface and marking the texture map as not downloaded in response to a state change that affects texture map processing.

* * * * *